United States Patent Office 3,494,080
Patented Feb. 10, 1970

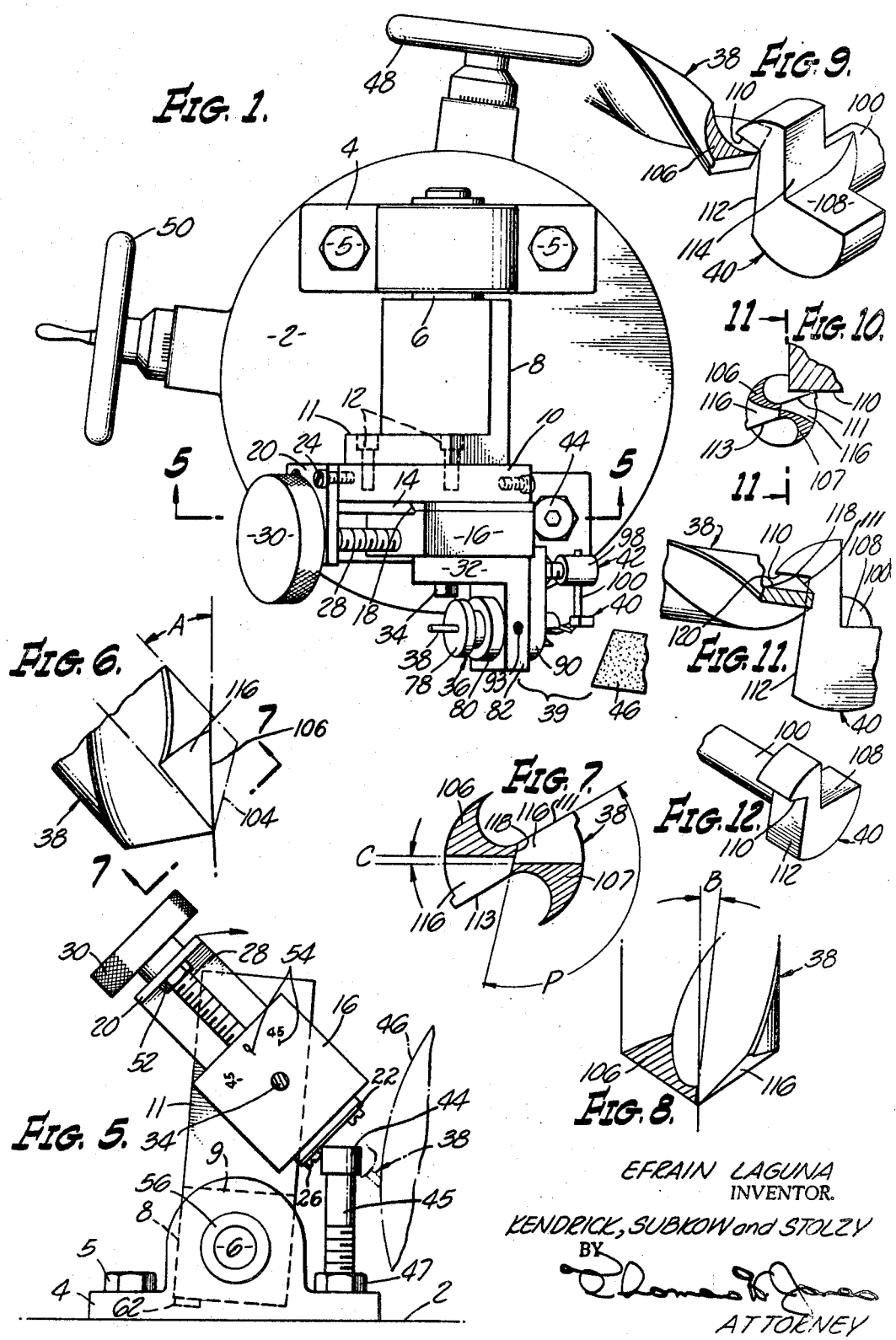
Feb. 10, 1970  E. LAGUNA  3,494,080
MACHINE FOR GRINDING SPLIT POINT DRILLS
Filed June 14, 1967  2 Sheets-Sheet 1
EFRAIN LAGUNA
INVENTOR.
KENDRICK, SUBKOW and STOLZY
BY
ATTORNEY

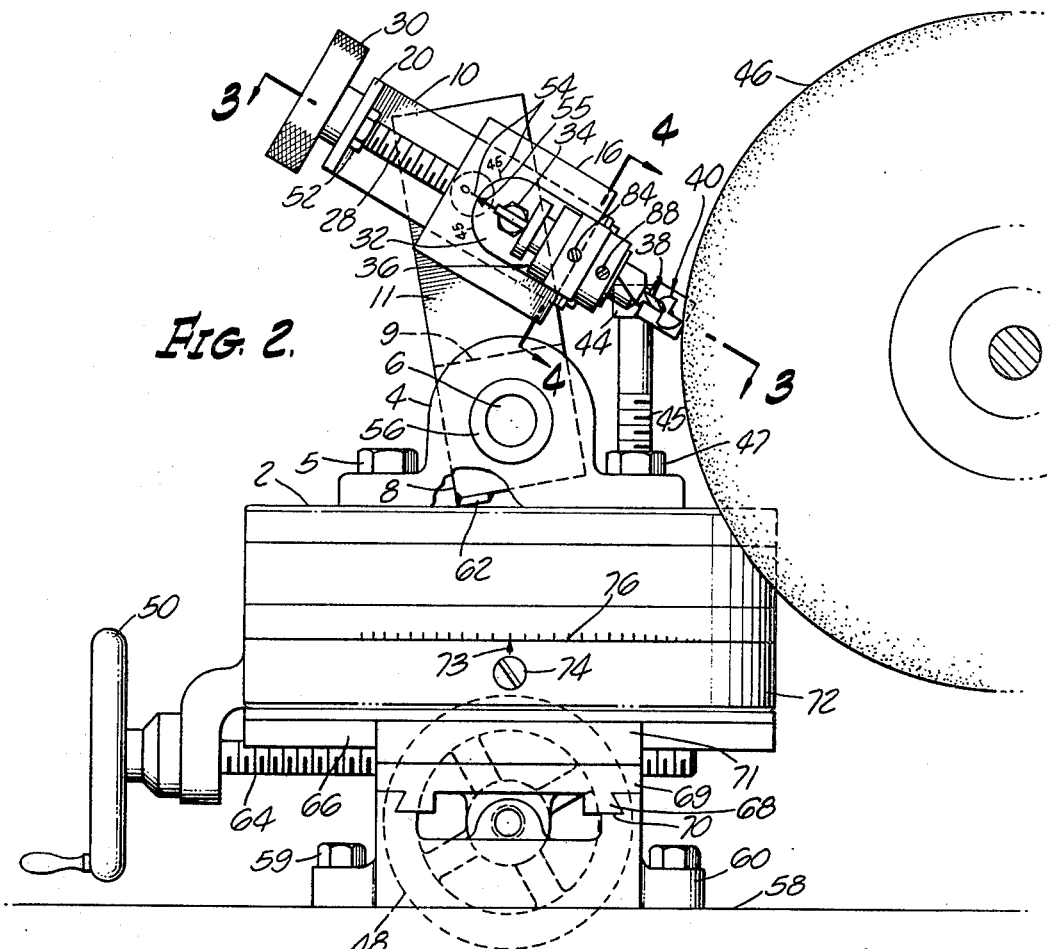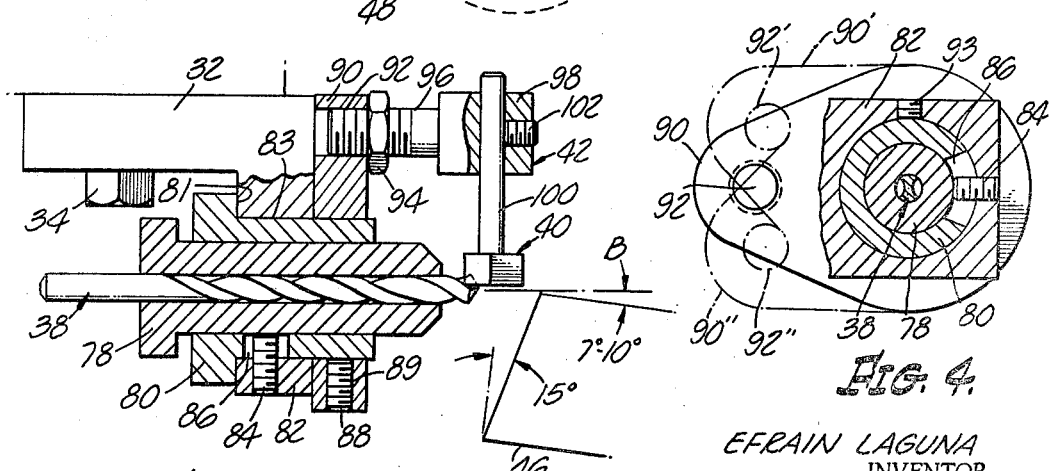

3,494,080
MACHINE FOR GRINDING SPLIT POINT DRILLS
Efrain Laguna, 605 W. 104th St.,
Los Angeles, Calif. 90044
Filed June 14, 1967, Ser. No. 646,010
Int. Cl. B24b *19/00*
U.S. Cl. 51—219
6 Claims

ABSTRACT OF THE DISCLOSURE

An apparatus for grinding split point drills, comprising a drill chuck assembly which holds a twist drill, a drill locater which engages the point surface of the drill and fixes its axial and rotational position, a table which can be rotated and translated in a substantially horizontal plane, means for rotatively mounting the drill chuck assembly on the table in a plane which is substantially vertical to the plane of the table, and means for adjusting the position of the drill chuck assembly within the substantially vertical plane. The drill chuck assembly and the twist drill held therein are rotated in a direction such that the point of the drill comes in contact with a grinding wheel. Rotation of the drill into the grinding wheel is controlled by a stop member which arrests the rotation at a predetermined point.

---

This invention relates to an improved apparatus and method for grinding split point drills.

Split point drills are superior to conventional twist drills for many types of drilling operations. A split point drill wears longer, drills a more accurately dimensioned hole, and removes chips in a more efficient manner than a conventional twist drill. Split point drills are used extensively in the drilling of hard metals, such as titanium.

Because of their superior performance, the use of split point drills is mandatory for various types of drilling operations. For example, various government specifications require the use of a split point drill in the drilling of certain metals.

In forming a split point drill, a twist drill is first ground to a point. Each point surface defines a cutting lip and a heel portion. In the use of a conventional twist drill, the cutting lips bite into the work on rotation of the drill, while the heel portions pass over the cut surface of the work after it has been contacted by the cutting lips. In a split point drill, the heel portions of the drill point are ground to an angle which differs from that of the remainder of the conical point. The angle to which the heel portions are ground must be very precisely controlled in order for the split point drill to function satisfactorily.

A method which has been used in the prior art for grinding the heel portions of the conical tip of a twist drill in order to form a split point drill has involved rotatably feeding a twist drill against a grinding wheel. In grinding a split point drill according to this method, the drill is held in a chuck having an internal diameter which is larger than the exterior diameter of the drill. Projecting inwardly from the inner surface of the chuck is a pin which engages a flute of the drill. As the drill is moved axially relative to the chuck, it is rotated through contact of the flute with the pin. The location of the pin relative to the flute thereby controls the positioning of the drill point as it contacts the grinding wheel surface and determines the surface which is ground.

The above described prior art method for grinding split point drills has not been satisfactory since it does not provide a sufficiently accurate positioning of the drill point relative to the grinding wheel. The helix angle, or the angle which the drill flute makes with respect to the longitudinal axis of the drill may vary somewhat from one drill to another within the tolerance requirements for the particular drill. This variation, although minor, may be large enough to result in improper grinding of the drill point in forming a split point drill.

In solving the problems of the prior art in regard to the grinding of split point drills, I have provided a method and apparatus in which a heel portion of the drill point which contacts the grinding wheel is located very accurately with respect to a cutting lip of the drill point. In my apparatus, a twist drill having a conventional point is held in a drill chuck assembly which is rotatively mounted on a table. The drill chuck assembly is adjustably mounted within its plane of rotation such that its position and that of the twist drill held therein can be varied. Positioned adjacent one end of the drill chuck assembly is a drill locater which contacts a point surface of the drill and fixes its axial position relative to ths drill chuck assembly. The drill locater also includes a lip portion which makes point contact with a cutting lip of the drill point at the point of intersection of the cutting lip with the drill body. The point contact of the lip portion with a cutting lip fixes very accurately the rotational position of the drill which in turn allows very accurate positioning of the heel portion of the drill point which comes in contact with the grinding wheel.

In operation, the accurately positioned drill chuck assembly and the twist drill which is very accurately positioned within the drill chuck assembly by means of the drill locater are rotated such that the heel portion of the drill point is brought into contact with the grinding wheel and is accurately ground. The movement of the drill into the grinding wheel is controlled by a stop member which arrests the movement at a predetermined point.

In describing a preferred embodiment of my invention, reference is made to the attached drawings in which:

FIG. 1 is a plan view of my machine;
FIG. 2 is a front-elevational view of my machine;
FIG. 3 is a sectional view taken along the cutting plane 3—3 of FIG. 2 and showing the details of the drill chuck assembly;
FIG. 4 is a sectional view taken along the cutting plane 4—4 of FIG. 2 and showing the details of the drill stop locater assembly;
FIG. 5 is a vertical section taken along the cutting plane 5—5 of FIG. 1;
FIG. 6 is a detail view of the split point drill point illustrating the angle of notch of the split point drill surface;
FIG. 7 is a frontal view of the point of a split point drill illustrating the web thickness C;
FIG. 8 is a side detail view of the split point drill illustrating the notch rake angle denoted B;
FIG. 9 is a detail view of the drill when in engagement with the drill locater which determines the positioning of the drill point relative to the grinding wheel;
FIG. 10 is a frontal view of the drill point in FIG. 9 showing in section the overhanging lip of the drill locater which engages the cutting lip of the drill point;
FIG. 11 is sectional view taken along the cutting plane 11—11 of FIG. 10, and
FIG. 12 is a detail view of the drill locater which engages the drill point and determines its position reltive to the grinding wheel.

Turning to FIG. 1, a rotatable table 2 supports pillows blocks 4, which are bolted to the table by means of bolts 5. Held within the pillow blocks 4 is a shaft 6 which is press-fit within an angle support block 8. As shown in FIG. 1, the angle support block is in an inclined position with its frontal surface shown in shaded portion. The upper face 9 of the angle support block 8 is inclined away from the shaded portion of the angle support block or toward the left as illustrated in FIG. 1.

Projecting upwardly from face 9 is an upstanding angle portion 11 which supports a guide block 10 by means of screws 12 which are threadedly engaged in guide block 10. Integral with the opposite face of guide block 10 are a pair of grooved guideways 14, one of which is shown in FIG. 1. The grooved guideways 14 engage with corresponding grooves 18 formed in a slidable block 16. A captive screw 28 is threadedly engaged with slidable block 16 and on rotation of the captive screw the block moves axially along the screw. The screw 28 is actuated by means of a knob 30 which is held by an end plate 20 secured to guide block 10 by means of screws 24. At the lower end of guide block 10 is a second end plate 22 secured to guide block 10 by means of screws 26. The end plate 22 acts as a stop and limits the movement of slidable block 16 along the grooved guideways 14 of guide block 10.

A support block 32 is rotatably secured to slidable block 16 by means of a bolt 34 which is threadedly engaged with slidable block 16. Carried by support block 32 is a drill chuck assembly 36 which holds a drill 38 in engagement with a drill locater 40 held by a stop locater assembly 42.

A pivot stop 44 extends upwardly from the table 2 and controls the forward rotation of the angle support block 8 on shaft 6. On contact with pivot stop 44, the forward movement of the drill point against the grinding wheel 46 ceases and the grinding operation of one of the heel surfaces of the grinding point is completed. The forward movement of the drill during the grinding operation is indicated by the width of the bracket indicated as 39 in FIG. 1. As described more fully in FIG. 2, movement of the table 2 from side to side relative to grinding wheel 46 is controlled through rotation of a wheel 48 while movement of table 2 either toward or away from the grinding wheel 46 is controlled through rotation of wheel 50.

Turning to FIG. 2, the table 2 is supported on a table support surface 58 by means of a guide block 60 which is fixedly held to the table by means of bolts 59. The guide block 60 contains grooved ways 70 in its upward surface in which slide corresponding projections 68 of a slideable block 69. Movement of block 69 relative to guide block 60 is controlled by means of rotation of positioning wheel 48, as shown in phantom in FIG. 2. Rotation of wheel 48 rotates a feed screw attached thereto, which is not shown in the drawings, which feed screw is engaged with block 69.

Slidable block 69 contains grooved guideways, which are not shown in the drawing, which are positioned perpendicularly to the grooved guideways 70 of block 60. In slidable engagement with the grooves in block 69 are corresponding projections 66 which depend downwardly from a block 71. A table feed screw 64 is rotated by wheel 50 in engagement with block 71. On rotation of wheel 50, the table feed screw 64 is moved either into or away from block 71 through engagement of the feed screw 64 with threads contained within block 71. This causes movement of block 71 relative to block 69.

Block 71 is affixed to support member 72 by any suitable means, such as welding or a threaded connection, which is not shown. The upper surface of support member 72 engages the lower surface of the table 2. Table 2 is rotatably supported on support member 72 through conventional means such as a roller bearing, not shown, and is held relative to support member 72 by means of a locking screw 74. The rotational positon of table 2 relative to table support member 72 is shown by means of indicia 76 marked on the peripheral surface of table 2 relative to a fixed indicator mark 73 on support member 72. It should be noted that the means for positioning the table 2 through rotation of wheels 48 or 50, or the rotation of table 2 relative to support member 72 is conventional and is illustrated in FIG. 2 only to the degree necessary to describe the overall functioning of my apparatus.

The shaft 6 is rotatably supported by means of conventional bearings 56 within pillow block 4. The captive screw 28 is held axially relative to end plate 20 by means of a fixed support member 52 which, for example, may project radially into an unthreaded groove in captive screw 28. The rearwardly inclined position of angle support block 8 is clearly shown in FIG. 2, together with its upper surface 9, which is shown in phantom. The rearward inclination of angle support block 8 is limited by means of a stop member 62 which is secured by conventional means, such as welding, to the undersurface thereof. When stop member 62 engages the surface of table 2, the rotative movement of support block 8 away from brinding wheel 46 is limited and block 8 rests on table 2.

The pivot stop 44, which limits rotation of the support block 8 and the structure supported thereby toward the grinding wheel 46, is carried by an upstanding threaded member 45 which engages pillow block 4 and is held in place by means of a lock nut 47.

The rotatable support block 32, as shown in FIG. 2, is held in position with respect to slidable block 16 by means of a bolt 34. The positon of support block 32 relative to slidable block 16 is determined by means of indicia marks 54 marked on the surface of slidable block 16 and a fixed pointer 55 on the surface of rotatable support block 32.

The movement of the drill 38 against the grinding wheel 46 is illustrated in FIG. 5, which shows the contact of pivot stop 44 against the end plate 22 so as to limit movement of the drill 38 against the grinding wheel 46.

The drill chuck assembly 36 and the stop locater assembly 42 are best shown in FIG. 3. The rotatable support block 32 is held by means of bolt 34, as described previously. Extending from block 32 is an angle portion 82 having a hole 83 drilled therein. Secured within hole 83 is a support chuck 80, and contained within support chuck 80 is a drill chuck 78 which contains drill 38. Support chuck 80 includes a shoulder portion 81 which rests against the angle portion 82 of rotatable support block 32. A locking screw 84 is threadedly engaged with angle portion 82 of rotatable support hook 32 and extends through an arcuate slot 86 in support chuck 80 into engagement with drill chuck 78, thereby holding it fixedly in place. Encircling the support chuck 80, at one end thereof, is a drill locater support 90 containing a threaded hole 92 into which is threadedly engaged a support arm 96, held in place with a lock nut 94. Support arm 96 terminates at a support head 98 which supports therein a drill locater arm 100 whose axis is positioned transversely of that of the support arm 96. Drill locater arm 100 is held within its support head 98 by means of a locking screw 102. At the outer end of drill locater arm 100 is carried a drill locater 40.

The drill locater support 90 is fixedly held with respect to support chuck 80 by means of a locking screw 88, which is threadedly engaged in a hole 89 within drill locater support 90 and bears against the exterior surface of support chuck 80.

The inter-relationship of the drill locater assembly with respect to the chuck assembly is more clearly shown in FIG. 4, which is a sectional view taken along the cutting plane 4—4 of FIG. 2. As shown in FIG. 4, the arcuate slot 86 permits relative rotative movement between the support chuck 80 and the fixed angle portion 82 of support block 32. By loosening a locking screw 93 which is threadedly engaged in a hole in the angle portion 82 of support block 32, the support chuck 80 is permitted to rotate to the limits allowed by the arcuate slot 86. Since the drill locater support 90 is secured to support chuck 80 through locking screw 88, the drill locater support 90 is rotated in conjunction with rotation of the support chuck 80.

The normal position of drill locater support 90 and threaded hole 92 is shown in solid line drawing in FIG. 4. The drill locater support 90 is shown in phantom at 90' and 90" and the hole 92 is likewise shown in phantom at 92' and 92" at positions resulting from rotation of the support chuck 80 from one extreme to the other within the range of movement permitted by the arcuate slot 86.

As will be described more fully hereinafter, it is necessary to be able to adjust the location of drill locater 40 to accommodate the grinding of various sized split point drills. The rotation of the drill locater support 90 in various positions, as indicated in FIGS. 3 and 4, permits more accurate positioning of the drill locater 40 since it, through connection with drill locater arm 100 and support head 98, moves in an arcuate path as the drill locater support 90 is rotated.

As shown in FIG. 9, a preferred form of drill locater 40, which I employ has cut-out portions on either side which define a large lip 108, and a small lip 110, as shown in FIGS. 11 and 12. The cut out portions of drill locater 40 also define a stop surface 114, and, as shown in FIGS. 11 and 12, a stop surface 112. The axial position of the drill 38 is determined by the drill chuck 78, as described in FIGS. 3 and 4. The longitudinal location of the drill tip is determined by its contact with a stop surface, either surface 112 or 114 on the drill locater 40. As shown in FIG. 9, the end of drill 38 engages the stop surface 112, while the rotative position of drill 38 is determined by contact of the cutting lip with the extending lip 110. This contact determines the portion of the split point drill surface 106, which is ground on contact with the grinding wheel 46.

FIG. 10 is a frontal axial view of the drill 38, as shown in FIG. 9, showing in section the extending lip 110 in contact with one of the cutting lips 111 of the drill point. Inasmuch as drill 38 is a double-fluted drill, it has another cutting lip 113, as shown in FIG. 10. The positioning of the ground split point surface 106 is determined by the contact of the cutting lip 111 against lip 110. On grinding of the surface 106, the drill is then moved in an axial direction away from the stop surface 112 and rotated 180° and moved forward into contact with stop surface 112, at which point the cutting lip 113 bears against extending lip 110. On movement of the drill tip against the griding wheel, the surface 107 is then ground.

FIG. 11 is a sectional view taken along the lines 11—11 of FIG. 10. As shown, the cutting lip 111, makes point contact with extending lip 110 at a point 118, at which point the cutting lip 111 of the drill point terminates and the drill body 20 begins. The point contact of the cutting lip 111 with the extending lip 110 provides a very accurate rotational positioning of the drill which in turn affords a very accurate positioning of the drill for grinding of the surface 106.

As shown in FIG. 12, the lip 108 is considerably deeper than lip 110. Thus, lip 108 accommodates a larger diameter drill which has a larger drill tip and requires a deeper lip in order to provide point contact between the cutting lip and the lip portion of the drill locater. For a small drill, a shorter lip is preferable, such as 110. As shown, the drill locater 40 can be changed in going from a grinding operation involving a small drill to one involving a large drill, or vice-versa, simply by rotating the drill locater arm and drill locater 40, through an angle of 180°. As described earlier, the drill locater 40 can be positioned through rotation of drill locater support 90 and support chuck 80. This changes the location of lip portions 108 or 110 relative to the drill 38 and the point 118 of the drill which is contacted by a lip portion of the locater 40. In grinding drills of various sizes, the drill locater 40 can be adjusted so as to vary the positioning of the lip portion 108 or 110 to make the required point contact with a cutting lip of the drill point at its point of intersection with the drill body.

In relating the functioning of my apparatus to the configuration of a split point drill, reference is made to FIGS. 6, 7 and 8. As shown in FIG. 6, the surface of the drill prior to grinding is shown in phantom at 104 and after grinding is shown in solid line at 106. The angle which the ground surface 106 makes with the drill axis is the angle of notch with respect to the drill axis, and is denoted as A in FIG. 6. This angle is varied by adjusting the location of the rotatable support block 32, as shown in FIG. 2, relative to the slidable block 16. On loosening of bolt 34 and rotation of support block 32 to a new position, as indicated by the location of the pointer 55 with respect to the marked indicia 54, the angle at which the drill point engages the grinding wheel is changed to give a corresponding change in the angle A, as shown in FIG. 6.

As shown in FIG. 7, the distance denoted C is the web thickness of the drill after the surfaces 106 and 107 have been ground. This is a critical dimension of the split point drill and is controlled by varying the position of sliding block 16 with respect to the guide block 10. Thus, on rotation of the knob 30 which causes rotation of captive screw 28, the slidable block 16 is either moved inwardly or outwardly with respect to the grinding wheel 46 depending upon the direction of rotation of the captive screw 28. As the slidable block 16 is moved inwardly toward the grinding wheel through rotation of knob 30, the web thickness C is decreased and as the slidable block is moved outwardly, the web thickness C is increased.

Also shown in FIG. 7 is the secondary cutting edge angle P which is the angle between the chisel edge 118 and the cutting lip 111 as measured in a clockwise direction from cutting lip 111. This angle, which is an important parameter in the drill configuration, can also be measured in a clockwise direction from cutting lip 113 to chisel edge 118. The angle P is determined by the rotational position of the drill 38 during the grinding operation. This, in turn, as described earlier in regard to FIGS. 9, 10 and 11, is determined by the point contact between the lip portion 110 or 108 and the cutting lip 113 or 111 at its point of intersection with the drill body. Movement of the drill locater 40 relative to drill 38 and drill chuck 78 through rotation of support chuck 80 and drill locater support 90, as described with regard to FIGS. 3 and 4, will vary the position of lip portion 110 or 108 relative to the cutting lip 113 or 111. This will vary the rotational position of the drill 38 which will vary the secondary cutting edge angle P. Thus, by adjusting the position of the drill locater 40, in the manner described, the secondary cutting edge angle P can be very accurately set in the grinding of a split point drill.

Turning to FIG. 8, the angle B is the notch rake angle and is the angle which the upper edge of the ground surface 106 makes with the vertical axis of the drill. The notch rake angle B is controlled by the location of the table 2 relative to the table support 72. As shown in FIG. 2, the table 2 is rotatable with respect to table support 72 on disengaging the locking screw 74. The precise location of the table 2 with respect to table support 72 is determined by means of indicia 76 and the fixed pointer 73, whose relative positions allow a precise setting of the notch rake angle B.

Rotation of table 2 through means of locking screw 74 while the grinding wheel 46 remains fixed in setting the notch rake angle B is illustrated in FIG. 3 where the notch rake angle B is shown in terms of the angle between grinding wheel 46 and the axis of drill 38. As illustrated, the notch rake angle B is generally set within the range of 7 to 10 degrees for grinding a split point drill. Also, as shown in FIG. 3, it is customary to dress the surface of the grinding wheel 46 at an angle of about 15 degrees, generally about 12 to 15 degrees, in grinding a split point drill.

As described in the foregoing specification, my invention provides a flexible apparatus which permits the rapid grinding of split point drills, as required in a mass production operation. Once the machine has been set up, a large number of drills can be ground by a machine operator who is relatively inexperienced. My machine is simple to operate and positions the drill very precisely with respect to the grinding wheel such that the drills are very accurately ground.

In describing the preferred embodiment of my invention, I have made reference to various parts by way of the attached drawings. It should be understood that the reference to specific parts, part numbers and portions of the drawings are solely for purposes of illustration and should not be construed as a limitation upon my apparatus and method, whose scope is to be limited only by the lawful scope of the appended claims.

I claim:

1. Apparatus for grinding split point drills, comprising: a table mounted in a substantially horizontal first plane; means for rotating and translating said table within said plane; a drill chuck assembly adapted to receive a twist drill; pillow blocks mounted on said table; a shaft rotatably secured within said pillow blocks, a support member mounted on said shaft; connecting means joining said support member to said drill chuck assembly such that said assembly is rotatably mounted in a second plane substantially vertical to the plane of said table; said drill chuck assembly including a guide block inclined toward the surface of said table in the direction of a grinding wheel; a slidable block secured to said guide block in slidable relation thereto; means to slide said slidable block with respect to said guide block and to accurately control the position of said slidable block with respect to said guide block; a rotatable support block; means for mounting said rotatable support block on said slidable block and controlling the angular position of said rotatable support block with respect to said slidable block; said drill chuck assembly being supported by said rotatable support block such that the position of said assembly may be adjusted within said second plane; a drill locater mounted axially of said drill chuck assembly at one end thereof, said locater including a stop surface adapted to engage the point surface of a twist drill contained within said assembly, and a lip surface adapted to make point contact with the point formed by the intersection of a cutting lip of the twist drill and the drill body, and stop means adapted to limit the rotation of said drill chuck assembly toward a grinding wheel such that a heel portion of the cutting lip of the twist drill is accurately ground.

2. The apparatus of claim 1 wherein said drill chuck assembly includes a drill chuck adapted to receive a twist drill; a support chuck adapted to receive said drill chuck, said support chuck supported by said rotatable support block; means connecting said drill locater to said support chuck; means securing said drill chuck against movement with respect to said rotatable support block; means permitting rotation of said support chuck with respect to said drill chuck and said rotatable support block, whereby said drill locater is moved relative to said drill chuck on rotation of said support chuck.

3. Apparatus for grinding drills, comprising: a table mounted in a substantially horizontal first plane; means for rotating and translating said table within said plane; a drill chuck assembly; means for rotatively mounting said assembly on said table in a second plane substantially vertical to the plane of said table; said assembly including a drill chuck having a bore adapted to receive a twist drill, means to translated said drill chuck within said second plane to position said drill chuck with respect to a grinding wheel, and means to position said drill chuck within said second plane by rotating said drill chuck about an axis which is substantially perpendicular to said second plane to position said drill chuck with respect to a grinding wheel; a drill locater in line with said bore; mounting means connecting said locater with said drill chuck such that translation of said drill chuck within said second plane or rotation of said drill chuck within said second plane about an axis which is substantially perpendicular to said second plane causes a corresponding movement of said locater; said locater including a stop surface adapted to engage the point surface of a twist drill contained within said assembly, and a lip surface adapted to make point contact with the point formed by the intersection of a cutting lip of the twist drill and the drill body, and stop means adapted to limit the rotation of said drill chuck assembly toward a grinding wheel.

4. The apparatus of claim 3 including means to change the position of said locater with respect to said drill chuck without changing the position of said drill chuck within said second plane.

5. The apparatus of claim 3 wherein said means to translate said drill chuck within said second plane includes a slidable block, means for slidably positioning said block within said second plane, and means connecting said slidable block to said drill chuck.

6. The apparatus of claim 5 wherein said means to rotate said drill chuck about an axis substantially perpendicular to said second plane includes a rotatable support block; means for mounting said support block on said slidable block and controlling the angular position of said rotatable support block with respect to said slidable block, and said rotatable support block supporting said drill chuck.

References Cited

UNITED STATES PATENTS

| | | | |
|---|---|---|---|
| 1,020,860 | 3/1912 | Vauclain | 51—219 |
| 2,713,755 | 7/1955 | Ganahl | 51—219 X |
| 2,827,741 | 3/1958 | Hillier | 51—219 X |
| 3,039,244 | 6/1962 | Vickerman | 51—219 |

HAROLD D. WHITEHEAD, Primary Examiner